UNITED STATES PATENT OFFICE.

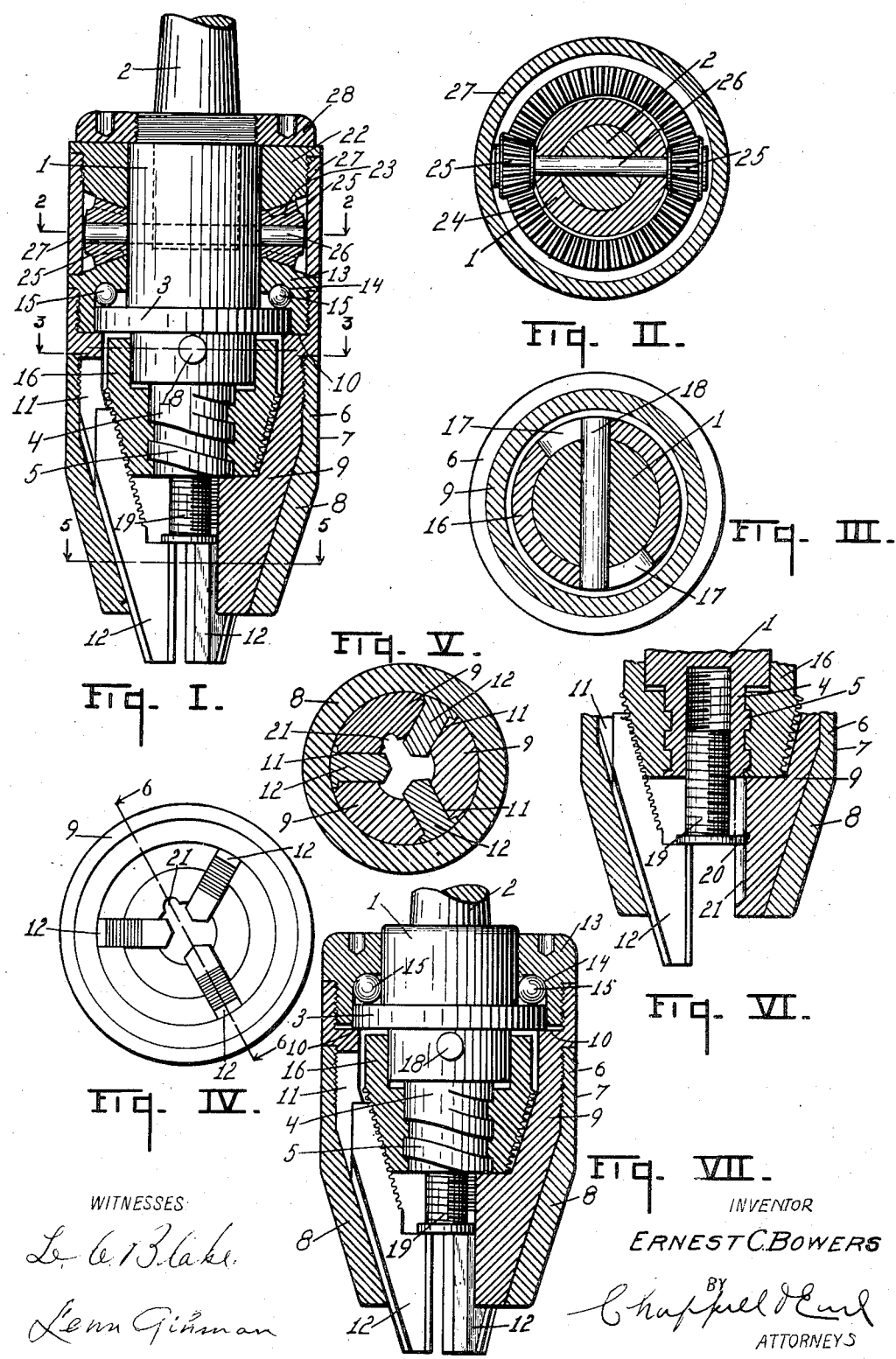

ERNEST C. BOWERS, OF KALAMAZOO, MICHIGAN, ASSIGNOR TO EUGENE COOK, OF KALAMAZOO, MICHIGAN.

CHUCK.

1,203,178.  Specification of Letters Patent.  Patented Oct. 31, 1916.

Application filed April 19, 1915. Serial No. 22,343.

*To all whom it may concern:*

Be it known that I, ERNEST C. BOWERS, a citizen of the United States, residing at Kalamazoo, Michigan, have invented certain new and useful Improvements in Chucks, of which the following is a specification.

This invention relates to improvements in chucks.

The main objects of this invention are: First, to provide an improved chuck in which the tool may be secured or released while the spindle is rotating. Second, to provide an improved chuck in which the tool is very securely retained or clamped by the jaws and at the same time one in which the jaws can be easily released to free the tool. Third, to provide an improved chuck having a thrust member which is advanced and retracted with the jaws so that the smaller sizes of tools are properly supported. Fourth, to provide an improved chuck having these advantages in which the parts are comparatively simple and economical to manufacture, and easily assembled, and one which is very durable and not likely to get out of repair.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a detail view of my improved chuck, parts being shown in longitudinal central section. Fig. II is a transverse section on a line corresponding to line 2—2 of Fig. I. Fig. III is a transverse section on a line corresponding to line 3—3 of Fig. I. Fig. IV is a top plan view of the body member with the jaws in position in the jaw ways thereof. Fig. V is a transverse section on a line corresponding to line 5—5 of Fig. I. Fig. VI is a detail vertical section on a line corresponding to line 6—6 of Fig. IV, showing details of the adjustable thrust member. Fig. VII is a detail view, partially in longitudinal central section, of a modified form of my invention, the quick release feature shown in Fig. I being omitted.

In the drawing similar reference characters refer to similar parts throughout the several views, and the sectional views are taken looking in the direction of the little arrows at the ends of the section lines.

Referring to the drawings, the spindle head member 1 is secured to or adapted to receive the driving spindle 2. The head member is provided with an annular bearing flange 3. Below this flange the head member has a reduced portion 4 provided with an external spiral or coarse thread 5.

The shell-like body member, designated generally by the numeral 6, is, for convenience in manufacture, formed of an outer shell 7 tapered at its lower end, as at 8, and an inner part 9 upon which the outer member is threaded. The member 9 is shouldered at 10 to engage the bearing flange 3. The inner part 9 has longitudinal T-shaped slots therein forming ways 11 for the jaws 12. These jaws are T-shaped in cross section to fit the ways, as shown in Fig. V. The ways 11 converge toward the bottom of the body so that as the jaws are retracted and extended they are closed or opened, the jaws being closed as they are extended and opened as they are retracted.

The body member is retained for rotative movement upon the head member by means of the retaining member 13, which is arranged above and embraces the flange 3 and is threaded into the body member. The retaining member is provided with a ball race 14 for the bearing balls 15 which travel on the bearing flange 3. The body member is, as stated, shouldered at 10 to engage this bearing flange. On the reduced externally threaded portion 4 of the body member I mount the jaw adjusting sleeve 16 which is externally threaded to engage the threads of the jaws. This adjusting sleeve has slots 17 in its upper edge which are engaged by the pin 18 arranged through the head member, thereby limiting the rotative movement of the adjusting sleeve on the head member, and consequently its longitudinal movement resulting from its threaded engagement with the spiral or coarse thread 5 of the head member.

I preferably provide a thrust member 19 which is threaded into the head member and provided with a driving lug 20 engaging the groove 21 in the body member so that the thrust member is driven with the body member, and as the head member and body member are relatively rotated the jaws are retracted or extended to open or close the same, and the thrust member is retracted or extended. The advantage of this is that small tools are supported so that they do not extend too far into the chuck.

To release the chuck without stopping I provide a releasing member 22, which is rotatably mounted upon the head member above the retaining member 13 and provided with a beveled gear 23. On the retaining member is a beveled gear 24. Arranged between and meshing with these gears are beveled pinions 25, the pinions being mounted on the spindle 26 carried by the head. A sleeve 27 is threaded upon the reversing member 22 and rests upon the retaining member 13. By grasping this sleeve when the spindle is rotating in a forward direction the body member is rotated in the opposite direction, thereby retracting the jaws. To clutch a tool when the spindle is rotating, the body member is grasped, which extends or closes the jaws. The reversing member is retained in position upon the head by the collar 28 threaded upon the upper end of the head member. When the quick release feature is not desired, the reversing member 22, the pinions and the retaining collar 28 are omitted, as is also the gear 24 on the retaining member 13,—see Fig. VII. The other parts remain the same.

My improved chuck grasps the tool very securely, but at the same time the jaws do not become wedged or clamped up so but that they can be readily released, as the relatively coarse screw thread connection for the adjusting sleeve to the head provides a limited rotative and longitudinal movement which accomplishes this result.

My improved chuck is comparatively simple in its parts, and the parts are simple and economical to produce and quickly and easily assembled.

I have illustrated and described my improvements in two forms in which I have adapted or embodied the same. I have not attempted to illustrate or describe other embodiments which I contemplate as I believe the disclosure made will enable those skilled in the art to which this invention relates to embody or adapt the same as may be desired. I desire, however, to be understood as claiming my improvements specifically in the form illustrated as well as broadly within the scope of the appended claims.

Having thus described my invention, what I claim as new and desire to secure by Letters Patent, is:

1. In a chuck, the combination of a head member provided with an annular bearing flange and with a reduced portion having coarse external threads thereon below said flange, a shell-like body member shouldered to coact with said bearing flange and provided with longitudinal jaw ways, a body retaining member rotatably mounted on said head member above said bearing flange and threaded into said body member, bearing balls interposed between said bearing flange and said retaining member, threaded jaws arranged in said ways, a tapered jaw adjusting sleeve having slots in its upper end and internally threaded to coact with said external threads of said head member, and externally threaded to coact with the threads of said jaws, a pin through said head engaging said slots permitting a limited rotative movement of said adjusting member relative to said head, a reversing member rotatably mounted on said head above said retaining member and provided with a beveled gear, said retaining member being provided with a beveled gear, pinions arranged between and meshing with said gears, a spindle for said pinions carried by said head member, a sleeve embracing said pinions secured to said reversing member, and a retaining collar threaded upon the upper end of said head above said reversing member.

2. In a chuck, the combination of a head member provided with an annular bearing flange and with a reduced portion having coarse external threads thereon below said flange, a shell-like body member shouldered to coact with said bearing flange and provided with longitudinal jaw ways, a body retaining member rotatably mounted on said head member above said bearing flange and threaded into said body member, bearing balls interposed between said bearing flange and said retaining member, threaded jaws arranged in said ways, a tapered jaw adjusting sleeve having slots in its upper end and internally threaded to coact with said external threads of said head member, and externally threaded to coact with the threads of said jaws, and a pin through said head engaging said slots permitting a limited rotative movement of said adjusting member relative to said head.

3. In a chuck, the combination of a head member provided with an annular bearing flange and with a reduced portion having coarse external threads thereon below said flange, a shell-like body member shouldered to coact with said bearing flange and provided with longitudinal jaw ways, a body retaining member rotatably mounted on said head member above said bearing flange and threaded into said body member, bearing balls interposed between said bearing flange and said retaining member, threaded jaws arranged in said ways, a tapered jaw adjusting sleeve having slots in its upper end and internally threaded to coact with said external threads of said head member, and externally threaded to coact with the threads of said jaws, a pin through said head engaging said slots permitting a limited rotative movement of said adjusting member relative to said head, and a drill thrust member threaded into said head and provided with a lug engaging a longitudinal groove in said body member whereby the thrust member is retracted and extended with the jaws.

4. In a chuck, the combination of a head member provided with an annular bearing flange, a shell-like body member shouldered to coact with said bearing flange and provided with longitudinal jaw ways, a body retaining member rotatably mounted on said head member above said bearing flange and threaded into said body member, jaws arranged in said ways, a jaw adjusting sleeve threaded upon said head member and having threaded engagement with said jaws, means for limiting the rotative movement of said adjusting sleeve on its threads on said head member, a reversing member rotatably mounted on said head above said retaining member and provided with a beveled gear, said retaining member being also provided with a beveled gear, and pinions carried by said head member meshing with said gears.

5. In a chuck, the combination of a head member provided with an annular bearing flange, a shell-like body member shouldered to coact with said bearing flange and provided with longitudinal jaw ways, a body retaining member rotatably mounted on said head member above said bearing flange and threaded into said body member, jaws arranged in said ways, a jaw adjusting sleeve threaded upon said head member and having threaded engagement with said jaws, means for limiting the rotative movement of said adjusting sleeve on its threads on said head member, a reversing member rotatably mounted on said head member and provided with a gear, said retaining member being also provided with a gear, and pinions carried by said head member meshing with said gears.

6. In a chuck, the combination of a head member provided with an annular bearing flange, a shell-like body member shouldered to coact with said bearing flange and provided with longitudinal jaw ways, a body retaining member rotatably mounted on said head member above said bearing flange and threaded into said body member, jaws arranged in said ways, a jaw adjusting sleeve threaded upon said head member and having threaded engagement with said jaws, means for limiting the rotative movement of said adjusting sleeve on its threads on said head member, a drill thrust member threaded into said head and having driving engagement with said body member whereby it is retracted and extended with the jaws, a reversing member rotatably mounted on said head member and provided with a gear, said retaining member being also provided with a gear, and pinions carried by said head member meshing with said gears.

7. In a chuck, the combination of a head member, a body member rotatably mounted on said head member and provided with longitudinal jaw ways, jaws arranged in said ways, a jaw adjusting sleeve threaded upon said head member and having threaded engagement with said jaws, means for limiting the rotative movement of said adjusting sleeve on its threads on said head member, a reversing member rotatably mounted on said head above said body member and provided with a beveled gear, a beveled gear rotatable with said body member, and pinions carried by said head member meshing with said gears.

8. In a chuck, the combination of a head member, a body member rotatably mounted on said head member and provided with longitudinal jaw ways, jaws arranged in said ways, a tapered jaw adjusting sleeve threaded upon said head member and having threaded engagement with said jaws, and means for limiting the rotative movement of said adjusting sleeve on its threads on said head member.

9. In a chuck, the combination of a head member, a body member rotatably mounted on said head member and provided with longitudinal jaw ways, jaws arranged in said ways, a jaw adjusting sleeve threaded upon said head member and having threaded engagement with said jaws, means for limiting the rotative movement of said adjusting sleeve on its threads on said head member, and a drill thrust member threaded into said head and having driving engagement with said body member whereby it is retracted and extended with the jaws.

10. In a chuck, the combination of a head member having coarse external threads at its lower end, a shell-like body member provided with converging longitudinal jaw ways rotatably mounted on said body member, threaded jaws arranged in said ways, a tapered jaw adjusting sleeve having slots in its upper end and internally threaded to coact with said external threads of said head member, and externally threaded to coact with the threads of said jaws, a pin through said head engaging said slots permitting a limited rotative movement of said adjusting member relative to said head, and a drill thrust member threaded into said head and provided with a lug engaging a longitudinal groove in said body member whereby the thrust member is retracted and extended with the jaws.

11. In a chuck, the combination of a head member having coarse external threads at its lower end, a shell-like body member provided with converging longitudinal jaw ways rotatably mounted on said body member, threaded jaws arranged in said ways, a tapered jaw adjusting sleeve having slots in its upper end and internally threaded to coact with said external threads of said head member, and externally threaded to coact with the threads of said jaws, and a pin through said head engaging said slots permitting a limited rotative movement of said adjusting member relative to said head.

12. In a chuck, the combination of a head member, a body member rotatably mounted on said head member and provided with converging longitudinal jaw ways, jaws arranged in said ways, a jaw adjusting sleeve mounted upon said head member for limited rotative and longitudinal movement thereon, and a reversing member rotatably mounted on said head above said body member and provided with a beveled gear, a beveled gear rotatable with said body member, and pinions carried by said head member meshing with said gears.

13. In a chuck, the combination of a head member, a body member rotatably mounted on said head member and provided with converging longitudinal jaw ways, jaws arranged in said ways, a tapered jaw adjusting sleeve mounted upon said head member for limited rotative and longitudinal movement thereon and having threaded engagement with said jaws.

14. In a chuck, the combination of a head member, a body member rotatably mounted on said head member and provided with converging longitudinal jaw ways, jaws arranged in said ways, a jaw adjusting sleeve mounted upon said head member for limited rotative and longitudinal movement thereon, and a drill thrust member threaded into said head member and having driving engagement with said body member whereby it is retracted and extended with the jaws.

15. In a chuck, the combination of a head member provided with an annular bearing flange, a shell-like body member shouldered to coact with said bearing flange and provided with converging longitudinal jaw ways, a body retaining member rotatably mounted on said head member above said bearing flange and threaded into said body member, jaws arranged in said ways, a jaw adjusting member carried by said head member, a drill thrust member threaded into said head and having driving engagement with said body member whereby it is retracted and extended with the jaws, a reversing member rotatably mounted on said head above said retaining member and provided with a beveled gear, said retaining member being provided with a beveled gear, pinions arranged between and meshing with said gears, a spindle for said pinions carried by said head member, a sleeve embracing said pinions secured to said reversing member, and a retaining collar threaded upon the upper end of said head above said reversing member.

16. In a chuck, the combination of a head member carrying a threaded portion, a body portion rotatably mounted on said head member and provided with converging longitudinal jaw-ways, jaws arranged in said ways and having teeth in engagement with said threaded portion, and a drill thrust member threaded into said head member, and having driving engagement with said body member whereby it is retracted and extended with the jaws.

17. In a chuck, the combination of a head member provided with an annular bearing flange, a shell-like body member shouldered to coact with said bearing flange and provided with converging longitudinal jaw ways, a body retaining member rotatably mounted on said head member above said bearing flange and threaded into said body member, jaws arranged in said ways, a jaw adjusting member carried by said head member, a reversing member rotatably mounted on said head above said retaining member and provided with a beveled gear, said retaining member being provided with a beveled gear, pinions arranged between and meshing with said gears, a spindle for said pinions carried by said head member, a sleeve embracing said pinions secured to said reversing member, and a retaining collar threaded upon the upper end of said head above said reversing member.

18. In a chuck, the combination of a head member having coarse external threads at its lower end, a shell-like body member provided with jaw ways rotatably mounted on said body member, jaws arranged in said ways, an adjusting sleeve having a slot in its upper end and internally threaded to coact with the external threads of said head member and having operative engagement with said jaws, and a pin engaging said slot permitting a limited rotative movement of said adjusting member relative to said head.

19. In a chuck, the combination of a head member, a body member rotatably mounted on said head member and provided with longitudinal jaw ways, jaws arranged in said jaw ways, a jaw adjusting sleeve threaded upon with said head member and having operative engagement with said jaws, means for limiting the rotative movement of said adjusting sleeve on its threads on said head member, a reversing member rotatably mounted on said head above said body member and provided with a beveled gear, a beveled gear rotatable with said body member, and pinions carried by said head member meshing with said gears.

20. In a chuck, the combination of a head member provided with an annular bearing flange, a shell-like body member shouldered to coact with said bearing flange and provided with longitudinal jaw ways, a body retaining member rotatably mounted on said head member above said bearing flange and threaded into said body member, jaws arranged in said ways, a jaw adjusting sleeve threaded upon said head member and having operative engagement with said jaws, means for limiting the rotative movement of said adjusting sleeve on its threads on said head member, a reversing member rotatably mounted on said head member and provided with a gear, said rotating member being provided with a gear, and pinions carried by said head member meshing with said gears.

21. In a chuck, the combination of a head member, a body member rotatably mounted on said head member provided with longitudinal jaw ways, jaws arranged in said jaw ways, a jaw adjusting sleeve having limited rotative movement on said body, the connection between said sleeve and body being such that the sleeve is shifted axially by its rotative movement, said adjusting sleeve having operative engagement with said jaws, a reversing member rotatively mounted on said head member and provided with a beveled gear, a beveled gear rotatable with said body member, and pinions carried by said head member meshing with said gears.

22. In a chuck, the combination of a head member, a body member rotatably mounted on said head member provided with longitudinal jaw ways, jaws arranged in said jaw ways, a jaw adjusting sleeve having limited rotative movement on said body, the connection between said sleeve and body being such that the sleeve is shifted axially by its rotative movement, said adjusting sleeve having operative engagement with said jaws, and a reversing member rotatably mounted on said head member and having driving connection with said body member for the purpose specified.

In witness whereof, I have hereunto set my hand and seal in the presence of two witnesses.

ERNEST C. BOWERS. [L. S.]

Witnesses:
LUELLA G. GREENFIELD,
MARGARET L. GLASGOW.